United States Patent
Gill

(10) Patent No.: US 6,549,382 B1
(45) Date of Patent: Apr. 15, 2003

(54) READ HEAD WITH ASYMMETRIC DUAL AP PINNED SPIN VALVE SENSOR

(75) Inventor: Hardayal Singh Gill, Portala Valley, CA (US)

(73) Assignee: International Business Machines Corporation, Armonk, NY (US)

( * ) Notice: Subject to any disclaimer, the term of this patent is extended or adjusted under 35 U.S.C. 154(b) by 384 days.

(21) Appl. No.: 09/594,236

(22) Filed: Jun. 14, 2000

(51) Int. Cl.[7] .................................................. G11B 5/39
(52) U.S. Cl. .................................. 360/324.11; 360/314
(58) Field of Search ............................... 360/314, 324.1, 360/324.11, 324.12

(56) References Cited

U.S. PATENT DOCUMENTS

| | | | |
|---|---|---|---|
| 5,287,238 A | 2/1994 | Baumgart et al. | 360/113 |
| 5,576,915 A | 11/1996 | Akiyama et al. | 360/113 |
| 5,627,703 A | 5/1997 | Smith | 360/113 |
| 5,701,222 A | 12/1997 | Gill | 360/113 |
| 5,705,973 A | 1/1998 | Yvan et al. | 338/32 |
| 5,751,521 A | 5/1998 | Gill | 360/113 |
| 5,766,780 A | 6/1998 | Huang et al. | 428/692 |
| 5,768,069 A | 6/1998 | Mauri | 360/113 |
| 5,856,897 A | 1/1999 | Mauri | 360/113 |
| 6,317,297 B1 * | 11/2001 | Tong et al. | 360/314 |
| 6,347,022 B1 * | 2/2002 | Saito | 360/126 |
| 6,381,105 B1 * | 4/2002 | Huai et al. | 360/314 |
| 6,418,000 B1 * | 7/2002 | Gibbons et al. | 360/324.11 |

* cited by examiner

*Primary Examiner*—David L Ometz
(74) *Attorney, Agent, or Firm*—Ervin F. Johnston

(57) ABSTRACT

A dual antiparallel (AP) pinned layer spin valve is provided for a read head wherein a sense current field opposes net ferromagnetic and demagnetizing fields from the first and second AP pinned layers on a free layer structure. In one embodiment the first and second AP pinned layers may be asymmetrical on each side of a free layer structure for providing a desired sense current field while in another embodiment one of the pinning layers may be insulative while the other is conductive so that the conductive pinning layer provides the necessary sense current field for counterbalancing the net ferromagnetic coupling and demagnetizing fields.

45 Claims, 7 Drawing Sheets

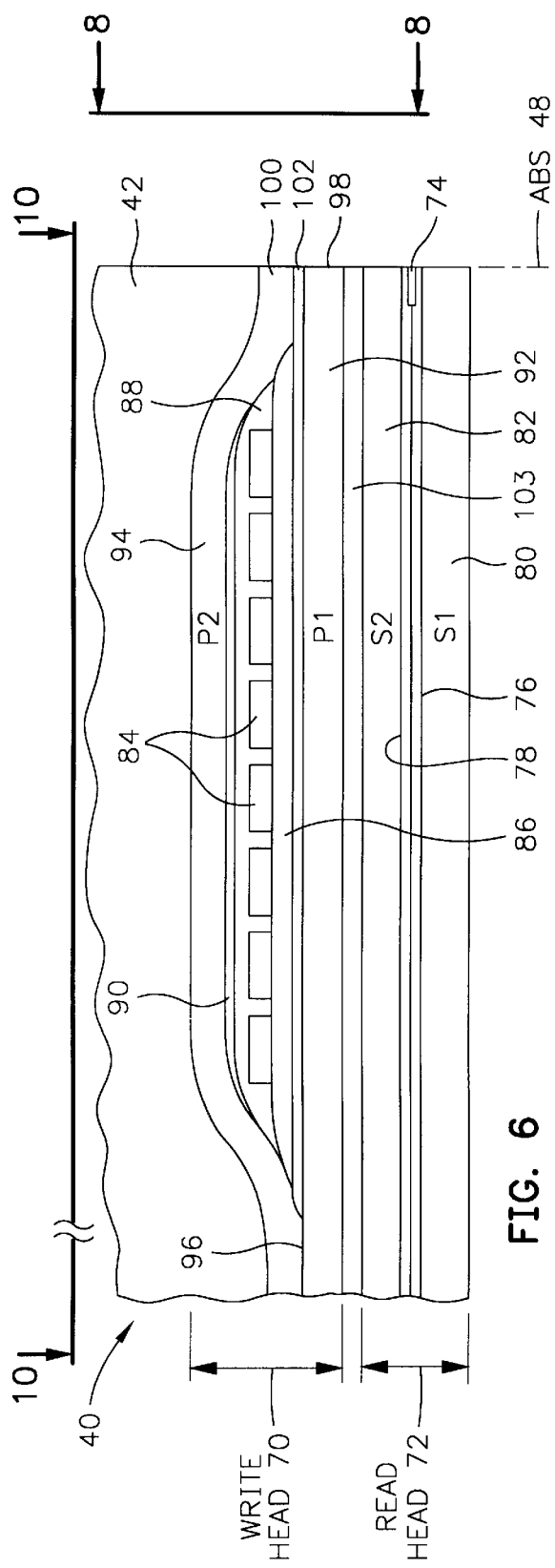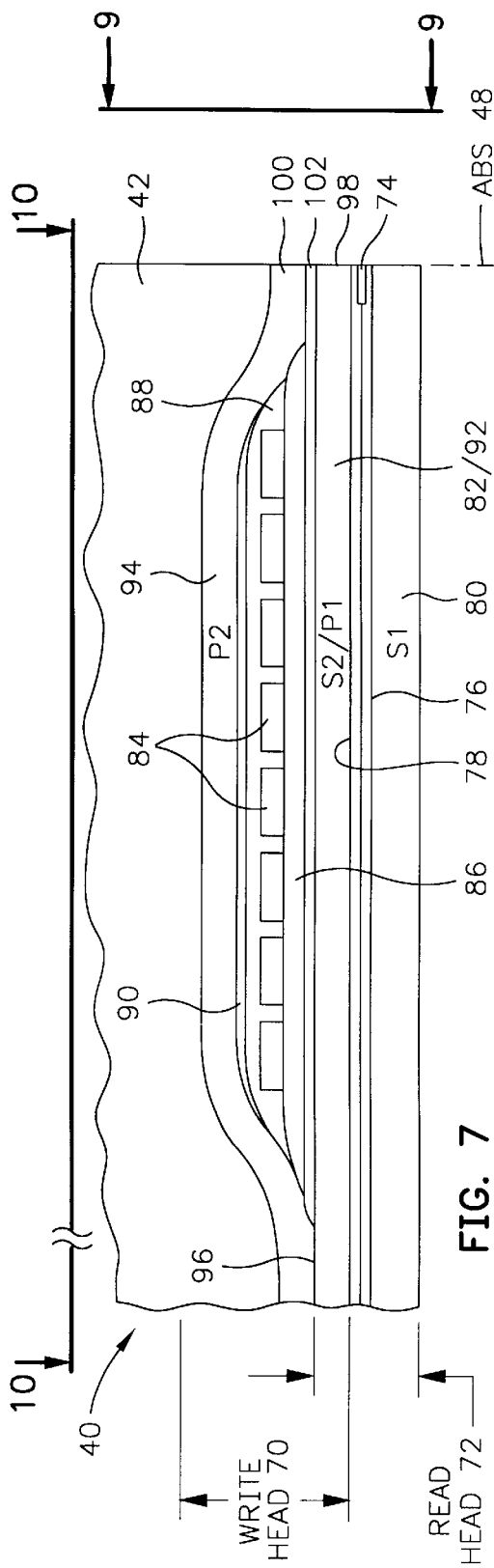

(ABS)

READ HEAD WITH ASYMMETRIC DUAL AP PINNED SPIN VALVE SENSOR

BACKGROUND OF THE INVENTION

1. Field of the Invention

The present invention relates to a read head with an asymmetric dual AP pinned spin valve sensor and, more particularly, to a sensor wherein conductive layers on one side of a free layer structure in the sensor are more conductive than conductive layers on the other side of the free layer structure, so that when a sense current is conducted through the sensor a sense current field is provided for counterbalancing net ferromagnetic coupling and demagnetizing fields from pinned layer structures.

2. Description of the Related Art

The heart of a computer is a magnetic disk drive which includes a rotating magnetic disk, a slider that has read and write heads, a suspension arm above the rotating disk and an actuator arm that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

An exemplary high performance read head employs a spin valve sensor for sensing the magnetic signal fields from the rotating magnetic disk. The sensor includes a nonmagnetic electrically conductive spacer layer sandwiched between a ferromagnetic pinned layer and a ferromagnetic free layer. An antiferromagnetic pinning layer interfaces the pinned layer for pinning the magnetic moment of the pinned layer 90° to an air bearing surface (ABS) wherein the ABS is an exposed surface of the sensor that faces the rotating disk. First and second leads are connected to the spin valve sensor for conducting a sense current therethrough. A magnetic moment of the free layer is free to rotate upwardly and downwardly with respect to the ABS from a quiescent or zero bias point position in response to positive and negative magnetic signal fields from the rotating magnetic disk. The quiescent position of the magnetic moment of the free layer, which is preferably parallel to the ABS, is when the sense current is conducted through the sensor without magnetic field signals from the rotating magnetic disk. If the quiescent position of the magnetic moment is not parallel to the ABS the positive and negative responses of the free layer will not be equal which results in read signal asymmetry, which is discussed in more detail hereinbelow.

The thickness of the spacer layer is chosen so that shunting of the sense current and a magnetic coupling between the free and pinned layers are minimized. This thickness is typically less than the mean free path of electrons conducted through the sensor. With this arrangement, a portion of the conduction electrons is scattered by the interfaces of the spacer layer with the pinned and free layers. When the magnetic moments of the pinned and free layers are parallel with respect to one another scattering is minimal and when their magnetic moments are antiparallel scattering is maximized. An increase in scattering of conduction electrons increases the resistance of the spin valve sensor and a decrease in scattering of the conduction electrons decreases the resistance of the spin valve sensor. Changes in resistance of the spin valve sensor is a function of cos θ, where θ is the angle between the magnetic moments of the pinned and free layers. When a sense current is conducted through the spin valve sensor, resistance changes cause potential changes that are detected and processed as playback signals from the rotating magnetic disk.

The sensitivity of the spin valve sensor is quantified as magnetoresistance or magnetoresistive coefficient dr/R where dr is the change in resistance of the spin valve sensor from minimum resistance (magnetic moments of free and pinned layers parallel) to maximum resistance (magnetic moments of the free and pinned layers antiparallel) and R is the resistance of the spin valve sensor at minimum resistance. Because of the high magnetoresistance of a spin valve sensor it is sometimes referred to as a giant magnetoresistive (GMR) sensor.

The transfer curve for a spin valve sensor is defined by the aforementioned cos θ where θ is the angle between the directions of the magnetic moments of the free and pinned layers. In a spin valve sensor subjected to positive and negative magnetic signal fields from a moving magnetic disk, which are typically chosen to be equal in magnitude, it is desirable that positive and negative changes in the resistance of the spin valve read head above and below a bias point on the transfer curve of the sensor be equal so that the positive and negative readback signals are equal. When the direction of the magnetic moment of the free layer is substantially parallel to the ABS and the direction of the magnetic moment of the pinned layer is perpendicular to the ABS in a quiescent state (no signal from the magnetic disk) the positive and negative readback signals should be equal when sensing positive and negative fields that are equal from the magnetic disk. Accordingly, the bias point should be located midway between the top and bottom of the transfer curve. When the bias point is located below the midway point the spin valve sensor is negatively biased and has positive asymmetry and when the bias point is above the midway point the spin valve sensor is positively biased and has negative asymmetry. The designer strives to improve asymmetry of the readback signals as much as practical with the goal being symmetry. When the readback signals are asymmetrical, signal output and dynamic range of the sensor are reduced.

Readback asymmetry is defined as $$\frac{V_1 - V_2}{\max(V_1 \text{ or } V_2)}$$

For example, +10% readback asymmetry means that the positive readback signal $V_1$ is 10% greater than it should be to obtain readback symmetry. 10% readback asymmetry is acceptable in many applications. +10% readback asymmetry may not be acceptable in applications where the applied field magnetizes the free layer close to saturation. In these applications +10% readback asymmetry can saturate the free layer in the positive direction and will, of course, reduce the negative readback signal by 10%. An even more subtle problem is that readback asymmetry impacts the magnetic stability of the free layer. Magnetic instability of the free layer means that the applied signal has disturbed the arrangement or multiplied one or more magnetic domains of the free layer. This instability changes the magnetic properties of the free layer which, in turn, changes the readback signal. The magnetic instability of the free layer can be expressed as a percentage increase or decrease in instability of the free layer depending upon the percentage of the increase or decrease of the asymmetry of the readback signal. Standard deviation of the magnetic instability can be calculated from magnetic instability variations corresponding to multiple tests of the free layer at a given readback asymmetry.

There is approximately a 0.2% decrease in standard deviation of the magnetic instability of the free layer for a 1% decrease in readback asymmetry. This relationship is substantially linear which will result in a 2.0% reduction in the standard deviation when the readback asymmetry is reduced from +10% to zero. Magnetic instability of the free layer is greater when the readback asymmetry is positive. Accordingly, the magnetic instability of the free layer is greater when the readback asymmetry is positive than when the readback asymmetry is negative.

The location of the transfer curve relative to the bias point is influenced by four major forces on the free layer of a spin valve sensor, namely a ferromagnetic coupling field $H_{FC}$ between the pinned layer and the free layer, a net demag field $H_D$ from the pinned layer, a sense current field $H_I$ from all conductive layers of the spin valve except the free layer, a net image current field $H_{IM}$ from the first and second shield layers. The strongest magnetic force on the free layer structure is the sense current field $H_I$. In an exemplary bottom spin valve sensor where the free layer is closer to the second gap layer than it is to the first gap layer the majority of the conductive layers are below the free layer structure between the free layer structure and the first gap layer. The amount of conductive material in this region is further increased if the pinning layer is metal instead of an oxide, such as nickel oxide (NiO). Accordingly, when the sense current is conducted through the sensor the conductive layers below the free layer structure causes a sense current field on the free layer structure which is minimally counterbalanced by a typical cap layer made of tantalum (Ta) on top of the free layer structure. Accordingly, there is a strong-felt need to counterbalance the strong sense current field exerted by the conductive layers of the spin valve sensor below the free layer structure in a bottom spin valve sensor. Further, the pinned layer structure below the free layer structure in a bottom spin valve sensor exerts a demagnetizing field on the free layer structure which needs to be counterbalanced to improve asymmetry of the spin valve sensor. There is a strong-felt need to counterbalance the sense current and demagnetizing fields and optimize the sense current, the pinning layer structure and the type of material of the pinning layer while still obtaining the desired readback symmetry of the spin valve sensor.

A dual spin valve sensor may be employed for increasing the magnetoresistive coefficient dr/R of a read head. In a dual spin valve sensor first and second pinned layer structures are employed with a first spacer layer between the first pinned layer structure and the free layer structure and a second spacer layer located between the second pinned structure and the free layer structure. With this arrangement the spin valve effect is additive on each side of the free layer structure to increase the magnetoresistive coefficient dr/R of the read head. In order to reduce demagnetizing fields from the first and second pinned layers on the free layer structure, each of the pinned layer structures may be an antiparallel (AP) pinned layer. An AP pinned layer has an antiparallel coupling (APC) film which is located between ferromagnetic first and second AP pinned films. The first and second AP pinned films have magnetic moments which are antiparallel with respect to one another because of the strong antiferromagnetic coupling therebetween. The AP pinned layer is fully described in commonly assigned U.S. Pat. No. 5,465,185 which is incorporated by reference herein. Because of the partial flux closure between the first and second AP pinned films of each first and second AP pinned layers, each AP pinned layer exerts only a small demagnetizing field on the free layer structure. These demagnetizing fields, however, are additive since the magnetic moments of the AP pinned films immediately adjacent the free layer structure must be in-phase (parallel with respect to one another) in order for the spin valve effect to be additive. Further, the magnetic moments of the AP pinned films immediately adjacent the free layer structure exert ferromagnetic coupling fields $H_{FC}$ on the free layer structure which are also additive and are parallel to the demagnetizing fields $H_D$. Accordingly, a net demagnetizing field $H_D$, which is an addition of the demagnetizing fields from the AP pinned layers and a net ferromagnetic coupling field $H_{FC}$, which is an addition of the ferromagnetic coupling fields, act on the free layer structure. The net demagnetizing field and the net ferromagnetic coupling field are additive to urge the magnetic moment of the free layer structure from its zero bias position parallel to the ABS. There is a strong-felt need to counterbalance these magnetic fields on the free layer structure so as to obtain proper biasing thereof.

SUMMARY OF THE INVENTION

The present invention provides a dual AP pinned layer read head wherein a sense current field counterbalances the net ferromagnetic coupling and net demagnetizing fields from the AP pinned layers. This is accomplished by providing more conductive material on one side of the free layer structure than the other side of the free layer structure, so that when a sense current $I_S$ is conducted through the sensor in a proper direction a sense current field will oppose the net ferromagnetic coupling and net demagnetizing fields. In one embodiment of the invention the thicknesses of the AP pinned films of the AP pinned layers are varied so that one of the AP pinned layers provides more sense current field than the other AP pinned layer when a sense current is conducted through the sensor. When a sense current is conducted in a proper direction the sense current field from the more conductive AP pinned layer will counterbalance the net ferromagnetic and demagnetizing fields from the AP pinned layer. In this embodiment the top and bottom pinning layers may be composed of a same antiferromagnetic metal, such as iridium manganese (IrMn).

In another embodiment the first pinning layer may be nickel oxide (NiO) and the second pinning layer may be composed of an antiferromagnetic metal, such as iridium manganese (IrMn). In the second embodiment the first and second AP pinned layers may be symmetrical on each side of the free layer structure, in which case the only variance in thickness between the AP pinned films is within each AP pinned layer. Also, in the second embodiment the nickel oxide (NiO) first pinning layer may be employed for providing at least a portion of the first read gap layer.

An object of the present invention is to provide a dual AP pinned layer sensor wherein a sense current field is employed for counterbalancing net ferromagnetic and demagnetizing fields from the AP pinned layers on a free layer structure.

Other objects and attendant advantages of the invention will be appreciated upon reading the following description taken together with the accompanying drawings.

BRIEF DESCRIPTION OF THE DRAWINGS

FIG. 6 is a partial view of the slider and a piggyback magnetic head as seen in plane 6—6 of FIG. 2;

FIG. 7 is a partial view of the slider and a merged magnetic head as seen in plane 7—7 of FIG. 2;

DESCRIPTION OF THE PREFERRED EMBODIMENTS

Magnetic Disk Drive

Figure 1:
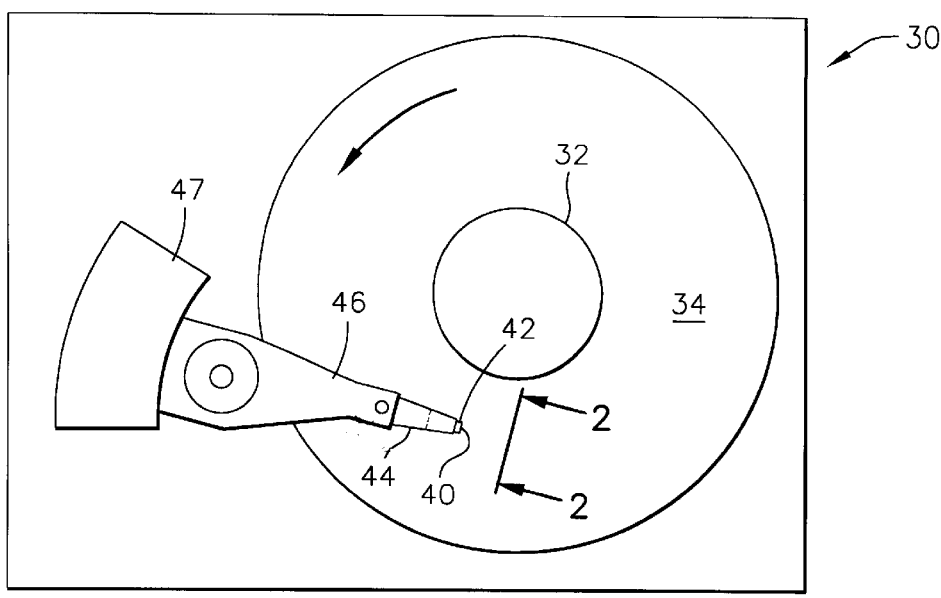
FIG. 1 is a plan view of an exemplary magnetic disk drive.
Figure 2:
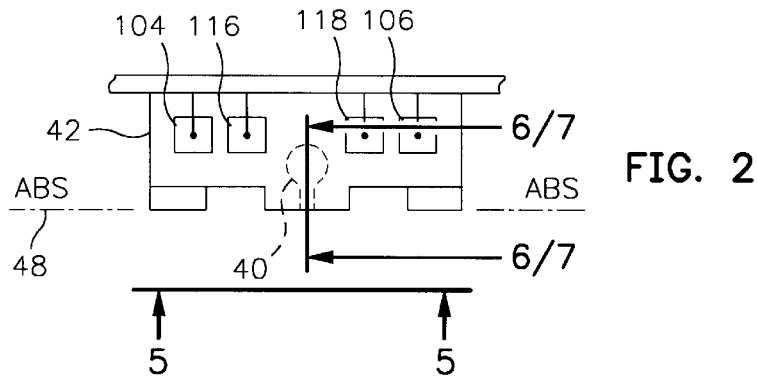
FIG. 2 is an end view of a slider with a magnetic head of the disk drive as seen in plane 2—2 of FIG. 1.
Figure 3:
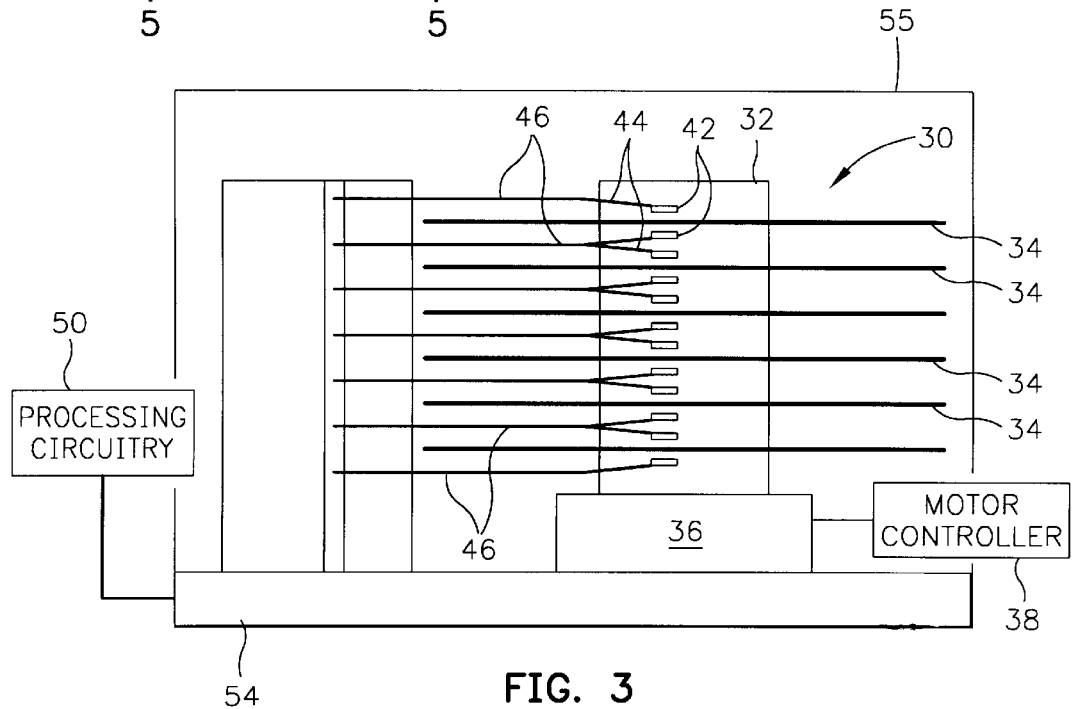
FIG. 3 is an elevation view of the magnetic disk drive wherein multiple disks and magnetic heads are employed.
Figure 4:
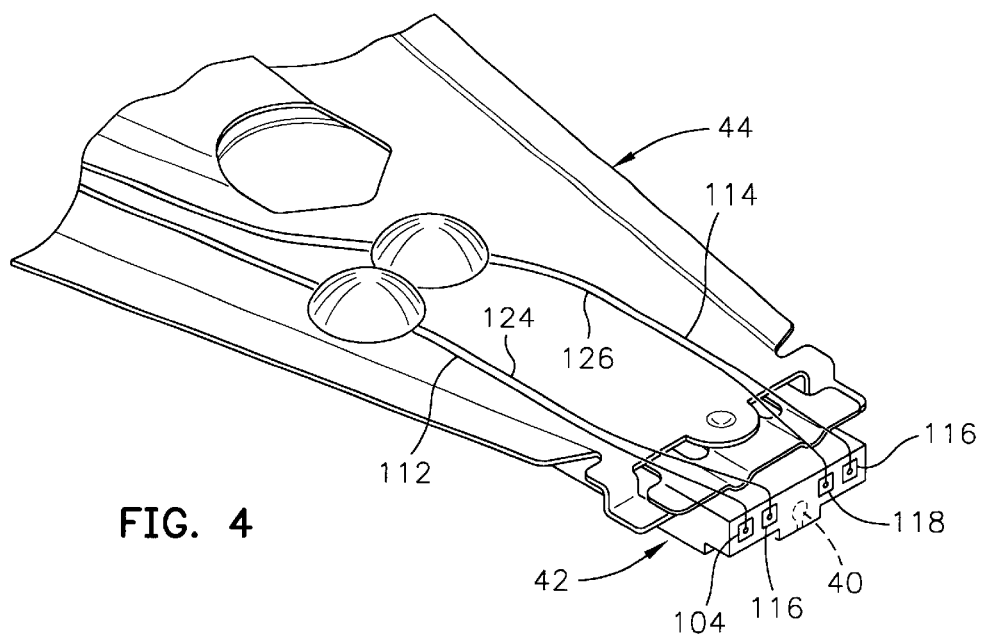
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 µm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing, as shown in FIG. 3.

Figure 5:
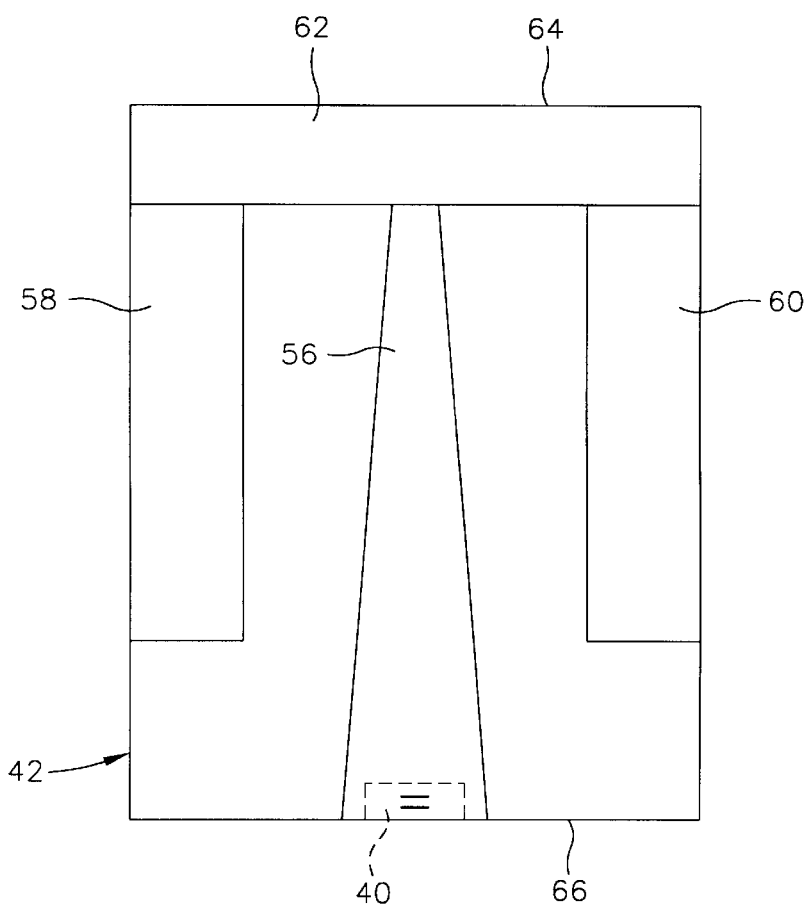
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 8:
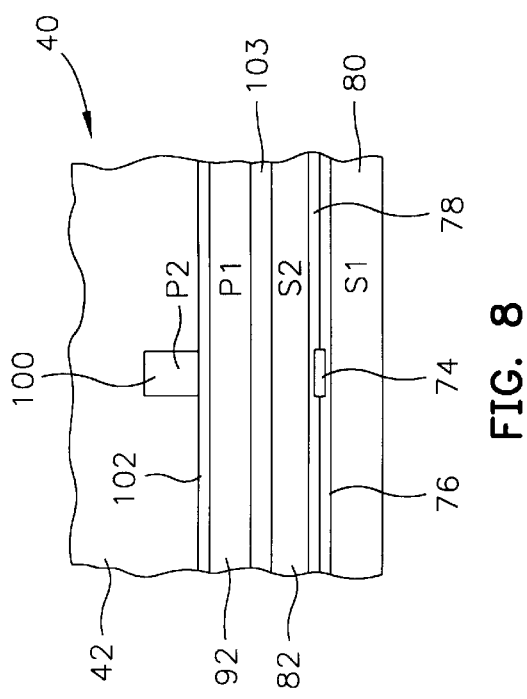
FIG. 8 is a partial ABS view of the slider taken along plane 8—8 of FIG. 6 to show the read and write elements of the piggyback magnetic head.

FIG. 6 is a side cross-sectional elevation view of a piggyback magnetic head 40, which includes a write head portion 70 and a read head portion 72, the read head portion employing a spin valve sensor 74 of the present invention. FIG. 8 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current $I_S$ conducted through the sensor causes these resistance changes to be manifested as potential changes. These potential changes are then processed as readback signals by the processing circuitry 50 shown in FIG. 3.

Figure 10:
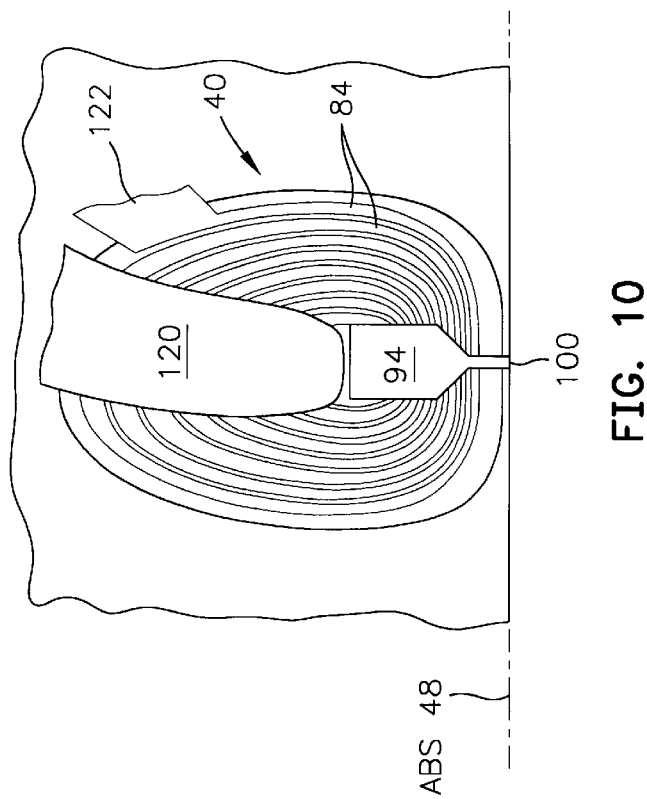
FIG. 10 is a view taken along plane 10—10 of FIGS. 6 or 7 with all material above the coil layer and leads removed.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 10) to leads 124 and 126 on the suspension.

Figure 9:
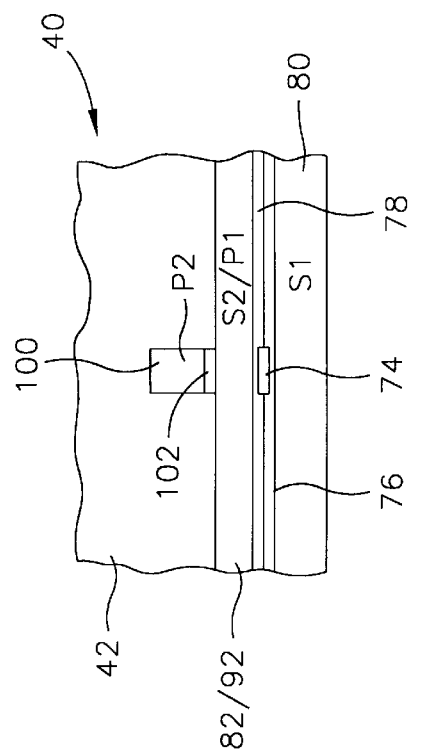
FIG. 9 is a partial ABS view of the slider taken along plane 9—9 of FIG. 7 to show the read and write elements of the merged magnetic head.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted.

Figure 11:
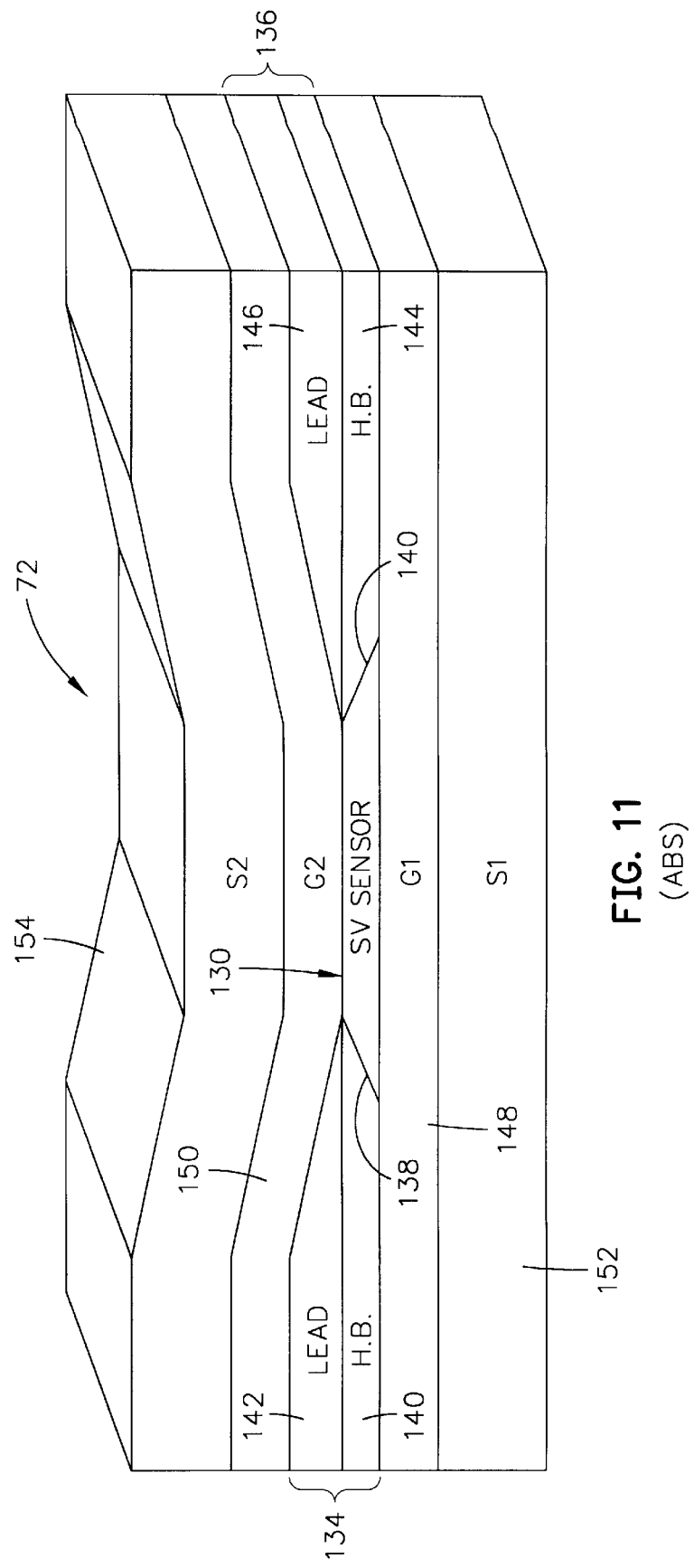
FIG. 11 is an enlarged isometric illustration of a read head which has a spin valve sensor.

FIG. 11 is an isometric ABS illustration of the read head 72 shown in FIGS. 6 or 8. The read head 72 includes the present spin valve sensor 130 which is located on an antiferromagnetic (AFM) pinning layer 132. First and second hard bias and lead layers 134 and 136 are connected to first and second side edges 138 and 140 of the spin valve sensor. This connection is known in the art as a contiguous junction and is fully described in commonly assigned U.S. Pat. No. 5,018,037 which is incorporated by reference herein. The first hard bias and lead layers 134 include a first hard bias layer 140 and a first lead layer 142 and the second hard bias and lead layers 136 include a second hard bias layer 144 and a second lead layer 146. The hard bias layers 140 and 144 cause magnetic fields to extend longitudinally through the spin valve sensor 130 for stabilizing the magnetic domains therein. The spin valve sensor 130 and the first and second hard bias and lead layers 134 and 136 are located between nonmagnetic electrically insulative first and second read gap layers 148 and 150. The first and second read gap layers 148 and 150 are, in turn, located between ferromagnetic first and second shield layers 152 and 154.

Figure 12:
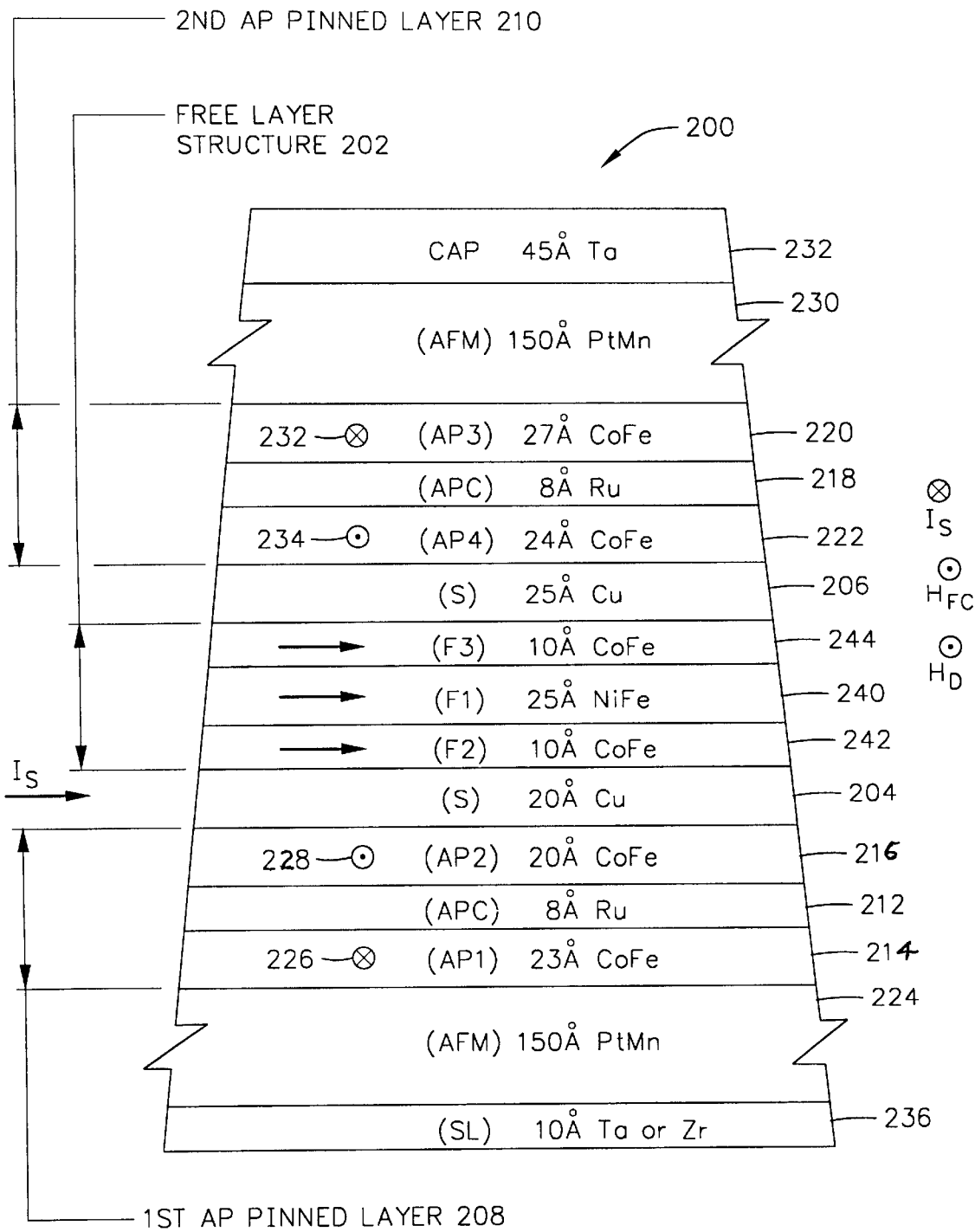
FIG. 12 is an ABS illustration one embodiment of the present dual spin valve sensor.

FIG. 12 is an ABS illustration of one embodiment of the present dual AP pinned spin valve sensor 200. In this embodiment a free layer structure 202 is located between nonmagnetic conductive first and second spacer layers 204 and 206. The first and second spacer layers 204 and 206 are, in turn, located between first and second AP pinned layers 208 and 210. The first AP pinned layer 208 includes an antiparallel coupling (APC) film 212 which is located between ferromagnetic first and second AP films (AP1) and (AP2) 214 and 216. The second AP pinned layer 210 includes a second antiparallel coupling (APC) layer 218 which is located between ferromagnetic third and fourth AP films (AP3) and (AP4) 220 and 222.

An antiferromagnetic (AFM) pinning layer 224 is exchange coupled to the first AP pinned film 214 for pinning a magnetic moment 226 of the first AP pinned film perpendicular to the ABS, such as into the head as shown in FIG. 12. By strong antiparallel coupling between the AP pinned films and 216 the AP pinned film 216 has a magnetic moment 228 which is antiparallel to the magnetic moment 226. A second antiferromagnetic (AFM) pinning layer 230 is exchange coupled to the third AP pinned film 220 for pinning a magnetic moment 232 of the third AP pinned film perpendicular to the ABS and into the head, as shown in FIG. 12. Again, by a strong antiparallel coupling field between the third and fourth AP pinned films 220 and 222 the fourth AP pinned film 222 has a magnetic moment 234 which is antiparallel to the magnetic moment 232.

A seed layer (SL) 236 may be provided for the first pinning layer 224 and a cap layer 238 may be provided for the second pinning layer 230. The free layer structure 202 may include a nickel iron (NiFe) film 240 which is located between first and second cobalt iron (CoFe) films 242 and 244. It has been found that the cobalt iron (CoFe) films between the nickel iron film 240 and the copper (Cu) spacer layers 204 and 206 increase the magnetoresistive coefficient dr/R.

In the embodiment shown in FIG. 12 each of the first and second pinning layers 224 and 230 may be identical and composed of a metal such as platinum manganese (PtMn). Further, in this embodiment one of the AP pinned layers 208 and 210 is more conductive than the other AP pinned layer so that a net sense current field is exerted on the free layer structure when the sense current $I_S$ is conducted through the sensor. The net sense current field is employed to counterbalance the net ferromagnetic coupling and demagnetizing fields. The net demagnetizing field $H_D$ on the free layer structure 202 is a result of adding the demagnetizing fields from each of the AP pinned layers 208 and 210. Each AP pinned layer has a net demagnetizing field which is a resultant demagnetizing field after flux closure between the AP pinned films of the AP pinned layer. For instance, if the third AP pinned layer 220 has a thickness greater than the fourth AP pinned layer 222 there is a net the field from the third AP pinned layer which is directed out of the page on the free film structure 202. If the first AP pinned film 216 is thicker than the second AP pinned film 214 there is a net demagnetizing field from the post first AP pinned film which is also directed out of the page on the free layer structure 202. These are added together which results in the net demagnetizing field $H_D$ shown in FIG. 12. Further, the second AP pinned film 216 and the fourth AP pinned film 222 exert ferromagnetic coupling fields on the free layer structure which are caused by and are in the same direction as the magnetic moments 228 and 234. Accordingly, a combination of these ferromagnetic coupling fields is directed out of the paper, as shown at $H_{FC}$ in FIG. 12. If the second AP pinned layer 210 has more conductive material than the first AP pinned layer 208 and the sense current $I_S$ is directed from left to right, as shown in FIG. 12, there will be a net sense current field $I_S$, which is directed into the paper which is employed for counterbalancing the net ferromagnetic and demagnetizing fields $H_{FC}$ and $H_D$. The differential in conductive material between the first and second AP pinned layers 208 and 210 can be easily adjusted to apply the proper sense current fields for completely counterbalancing the ferromagnetic coupling and demagnetizing fields $H_{FC}$ and $H_D$.

Exemplary thicknesses and materials for the layers shown in FIG. 12 are 10 Å of tantalum (Ta) or zirconium (Zr) for the seed layer 236, 150 Å of platinum manganese (PtMn.) for the first pinning layer 224, 23 Å of cobalt iron (CoFe) for the first AP pinned film 214, 8 Å of ruthenium (Ru) for the antiparallel coupling layer 212, 20 Å of cobalt iron (CoFe) for the second AP pinned film 216 20 Å of copper (Cu) for the first spacer layer 204, 10 Å of cobalt iron (CoFe) for the second free film 242, 25 Å of nickel iron (NiFe) for the first free film 240, 10 Å of cobalt iron (CoFe) for the second free film 244, 25 Å of copper (Cu) for the second spacer layer 206, 24 Å of cobalt iron (CoFe) for the fourth AP pinned film 222, 8 Å of ruthenium (Ru) for the antiparallel coupling film 218, 27 Å of cobalt iron (CoFe) for the third AP film 220, 150 Å of platinum manganese (PtMn) for the second pinning layer 230, and 45 Å of tantalum (Ta) for the cap layer 238. With this arrangement the third AP pinned film 220 is thicker than the fourth AP pinned film 222, the fourth AP pinned film 222 is thicker than the first AP pinned film 216 and the first AP pinned film 214 is thicker than the second AP pinned film 216. With these thicknesses the second AP pinned layer 210 has more conductive material than the first AP pinned layer 208 for providing the net sense current field $I_S$ to counterbalance the ferromagnetic and demagnetizing fields $H_{FC}$ and $H_D$. Further, the second spacer layer 206 is 5 Å thicker than the first spacer layer 204 and is very conductive because it is copper (Cu). Accordingly, the spacer layer on the side of the AP pinned layer with the greatest conductivity may also be thicker than the other spacer layer for optionally increasing the sense current field $I_S$ for counterbalancing the ferromagnetic coupling and demagnetizing fields $H_{FC}$ and $H_D$. It should be understood that the embodiment 200 in FIG. 12 is exemplary and that the first AP pinned layer 208 may be made more conductive than the second AP pinned layer 210, and the thicknesses of the AP pinned films may be varied so that the net ferromagnetic coupling and demagnetizing fields $H_{FC}$ and $H_D$ are into the head instead of out of the head. Likewise, the sense current $I_S$ may be from right to left instead of from left to right in order to achieve proper counterbalancing. Further, other materials may be used for the various layers, such as cobalt (Co), in lieu of cobalt iron (CoFe), and the first and second pinning layers may be other metals, such as nickel manganese (NiMn) or iridium manganese (IrMn).

Figure 13:
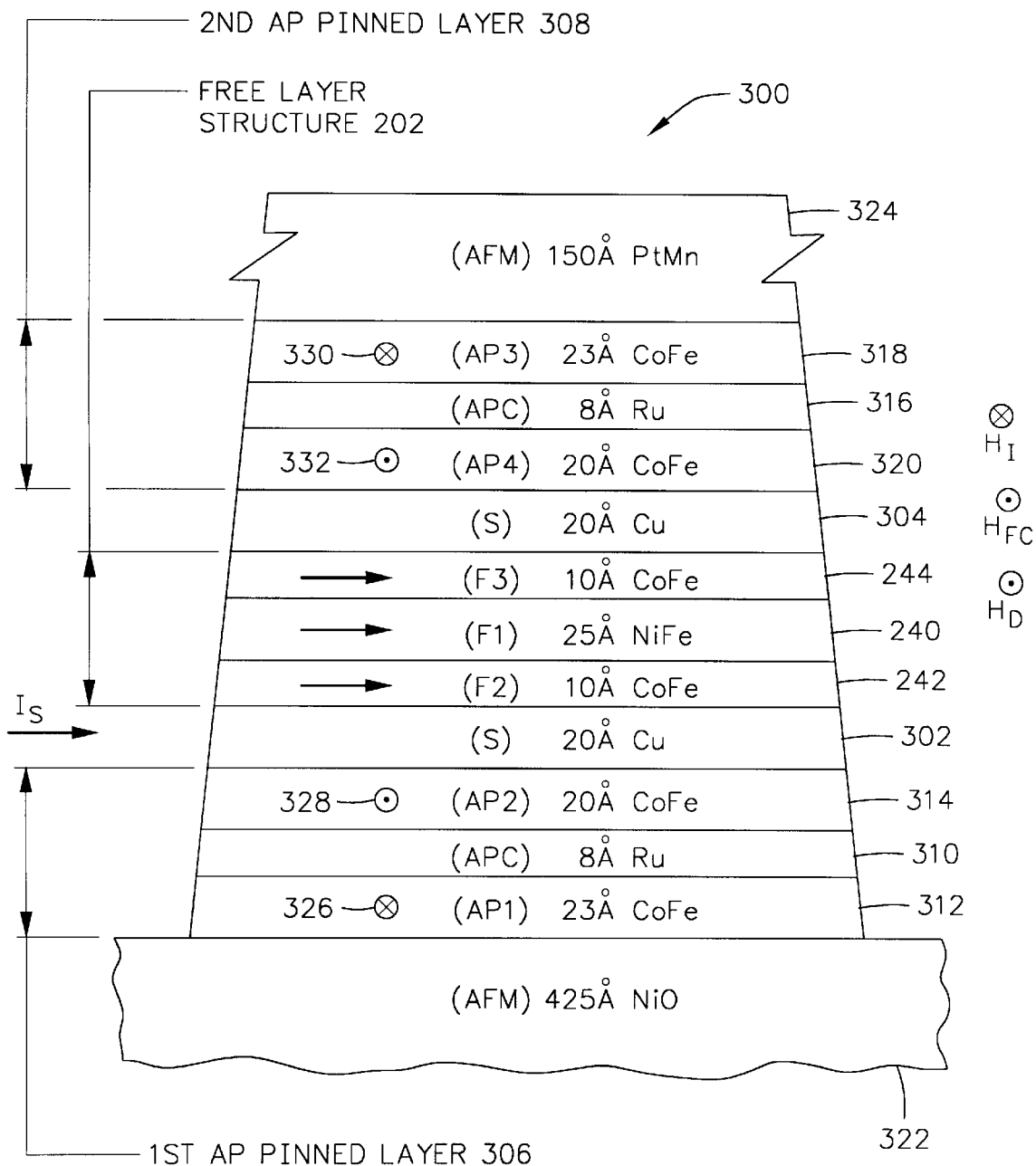
FIG. 13 is an ABS illustration of a second embodiment of the present dual spin valve sensor.

The second embodiment 300 of the present invention is illustrated in FIG. 13. This embodiment has a free layer structure 202 which is the same as the free layer structure 202 in FIG. 12. The free layer structure 202 is located between first and second spacer layers 302 and 304 and the spacer layers 302 and 304 are, in turn, located between first and second AP pinned layers 306 and 308. The first AP pinned layer 306 has an antiparallel coupling layer 310 which is located between first and second AP pinned films 312 and 314. The second AP pinned layer 308 has an antiparallel coupling layer 316 which is located between third and fourth AP pinned films (AP3) and (AP4) 318 and 320. A nickel oxide (NiO) pinning layer 322 is exchange coupled to the first AP pinned film 312 and a metallic second pinning layer 324 is exchange coupled to the third AP pinned film 318. Similar to FIG. 12, the pinning layer 322 may orient the magnetic moment 326 of the first AP pinned film perpendicular and into the head with the magnetic moment 328 of the second AP pinned film oriented antiparallel thereto. The second pinning layer 324 may pin the magnetic moment 330 of the third AP pinned film 318 perpendicular and into the head with the magnetic moment 332 of the fourth AP pinned film 320 antiparallel thereto. Accordingly, the first and second AP pinned layers 306 and 308 will exert a net demagnetizing field $H_D$ on the free layer structure, as well as a net ferromagnetic coupling field $H_{FC}$ on the free layer structure. It should be noted that in this embodiment the spin valve sensor is symmetrical about the free layer structure 202, except for the first and second pinning layers 322 and 324. Since the first pinning layer 322 is nonconductive and the second pinning layer 324 is conductive, there is more conductive material on top of the free layer structure 202 than there is therebelow. Accordingly, when the sense current $I_S$ is directed from left to right there will be a net sense current field $H_I$ which is directed into the head for counterbalancing the net ferromagnetic coupling and demagnetizing fields $H_{FC}$ and $H_D$. Further, in this embodiment the nickel oxide (NiO) material of the first pinning layer 322 may form at least a part of the first read gap layer. Similar to the FIG. 12 embodiment, the orientations of the magnetic moments and the sense current may be reversed and still be within the spirit of the invention.

Exemplary thicknesses for the materials of the embodiment 300 are 425 Å of nickel oxide (NiO) for the first pinning layer 322, 23 Å of cobalt iron (CoFe) for the first AP pinned film 312, 8 Å of ruthenium (Ru) for the first antiparallel coupling film 310, 20 Å of cobalt iron (CoFe) for the second AP pinned film 314, 20 Å of copper (Cu) for the first spacer layer 302, 20 Å of copper (Cu) for the second spacer layer 304, 20 Å of cobalt iron (CoFe) for the fourth AP pinned film 320, 8 Å of ruthenium (Ru) for the second AP coupling layer 316, 23 Å of cobalt iron (CoFe) for the third AP pinned film 318 and 150 Å of platinum manganese (PtMn) for the second pinning layer 324. It should be understood that the thicknesses and materials of these various layers are exemplary and may vary, as previously discussed in regard to the embodiment shown in FIG. 12.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A magnetic read head comprising:
    a spin valve sensor;
    nonmagnetic insulative first and second read gap layers;
    the spin valve sensor being located between the first and second read gap layers;
    ferromagnetic first and second shield layers; and
    the first and second read gap layers being located between the first and second shield layers;
    the spin valve sensor including:
        a ferromagnetic free layer structure;
        first and second antiparallel (AP) pinned layers;
        a nonmagnetic conductive first spacer layer between the free layer structure and the first AP pinned layer and a nonmagnetic conductive second spacer layer between the free layer structure and the second AP pinned layer;
        an antiferromagnetic first pinning layer exchange coupled to the first AP pinned layer for pinning a magnetic moment of the first AP pinned layer in a first direction; and
        an antiferromagnetic second pinning layer exchange coupled to the second AP pinned layer for pinning a magnetic moment of the second AP pinned layer in a second direction; and
    all of the layers between the free layer structure and the first read gap layer being less conductive or more conductive than all of the layers between the free layer structure and the second read gap layer so that when a sense current is conducted through the sensor in a predetermined direction a net sense current field is exerted on the free layer structure to oppose a net demagnetizing field and a net ferromagnetic coupling field exerted on the free layer structure by the first and second AP pinned layers.

2. A magnetic read head as claimed in claim 1 wherein the second AP pinned layer is more conductive than the first AP pinned layer.

3. A magnetic read head as claimed in claim 1 wherein the first pinning layer is nickel oxide (NiO) and the second pinning layer is composed of metal.

4. A magnetic read head comprising:
    a spin valve sensor;
    nonmagnetic insulative first and second read gap layers;
    the spin valve sensor being located between the first and second read gap layers;
    ferromagnetic first and second shield layers; and
    the first and second read gap layers being located between the first and second shield layers;
    the spin valve sensor including:
        a ferromagnetic free layer structure;
        first and second antiparallel (AP) pinned layers;
        a nonmagnetic conductive first spacer layer between the free layer structure and the first AP pinned layer and a nonmagnetic conductive second spacer layer between the free layer structure and the second AP pinned layer;
        an antiferromagnetic first pinning layer exchange coupled to the first AP pinned layer for pinning a magnetic moment of the first AP pinned layer in a first direction; and
        an antiferromagnetic second pinning layer exchange coupled to the second AP pinned layer for pinning a magnetic moment of the second AP pinned layer in a second direction;
    all of the layers between the free layer structure and the first read gap layer being less conductive or more conductive than all of the layers between the free layer structure and the second read gap layer so that when a sense current is conducted through the sensor in a predetermined direction a net sense current field is exerted on the free layer structure to oppose a net demagnetizing field and a net ferromagnetic coupling field exerted on the free layer structure by the first and second AP pinned layers;
    the second AP pinned layer being more conductive than the first AP pinned layer;
    the first AP pinned layer having a first antiparallel (AP) coupling film which is located between ferromagnetic first and second AP pinned films;
    the second AP pinned layer having a second antiparallel (AP) coupling film which is located between ferromagnetic third and fourth AP pinned films;

the first AP film being exchange coupled to the first pinning layer and the third AP pinned film being exchange coupled to the second pinning layer;

the third AP pinned film having a thickness that is greater than the fourth AP pinned film, the fourth AP pinned layer film having a thickness that is greater than the first AP pinned layer film and the first AP pinned layer film having a thickness that is greater than the second AP pinned layer film; and the first, second, third and fourth AP pinned films being composed of a same material.

5. A magnetic read head as claimed in claim 4 wherein the second spacer layer is more conductive than the first spacer layer.

6. A magnetic read head as claimed in claim 5 wherein each of the first and second pinning layers is composed of metal.

7. A magnetic read head as claimed in claim 6 wherein the free layer structure includes a first free layer of nickel iron (NiFe) located between second and third free layers composed of cobalt iron (CoFe).

8. A magnetic read head comprising:

a spin valve sensor;

nonmagnetic insulative first and second read gap layers;

the spin valve sensor being located between the first and second read gap layers;

ferromagnetic first and second shield layers; and the first and second read gap layers being located between the first and second shield layers;

the spin valve sensor including:
   a ferromagnetic free layer structure;
   first and second antiparallel (AP) pinned layers;
   a nonmagnetic conductive first spacer layer between the free layer structure and the first AP pinned layer and a nonmagnetic conductive second spacer layer between the free layer structure and the second AP pinned layer;
   an antiferromagnetic first pinning layer exchange coupled to the first AP pinned layer for pinning a magnetic moment of the first AP pinned layer in a first direction; and
   an antiferromagnetic second pinning layer exchange coupled to the second AP pinned layer for pinning a magnetic moment of the second AP pinned layer in a second direction;
   all of the layers between the free layer structure and the first read gap layer being less conductive or more conductive than all of the layers between the free layer structure and the second read gap layer so that when a sense current is conducted through the sensor in a predetermined direction a net sense current field is exerted on the free layer structure to oppose a net demagnetizing field and a net ferromagnetic coupling field exerted on the free layer structure by the first and second AP pinned layers;
   the second AP pinned layer being more conductive than the first AP pinned layer;
   the first AP pinned layer having a first antiparallel (AP) coupling film which is located between ferromagnetic first and second AP pinned films;
   the second AP pinned layer having a second antiparallel (AP) coupling film which is located between ferromagnetic third and fourth AP pinned films;
   the first AP film being exchange coupled to the first pinning layer and the third AP pinned film being exchange coupled to the second pinning layer;
   the first and third AP pinned films having an equal thickness and the second and fourth AP pinned layer films having an equal thickness;
   each of the first and third AP pinned films having a greater thickness than each of the second and fourth AP pinned layer films; and
   the first, second, third and fourth AP pinned films being composed of a same material.

9. A magnetic read head as claimed in claim 8 wherein the first pinning layer is nickel oxide (NiO) and the second pinning layer is composed of metal.

10. A magnetic read head as claimed in claim 9 wherein the free layer structure includes a first free layer of nickel iron (NiFe) located between second and third free layers composed of cobalt iron (CoFe).

11. A magnetic head assembly, having an air bearing surface (ABS), comprising:

a write head including:
   ferromagnetic first and second pole piece layers that have a yoke portion located between a pole tip portion and a back gap portion;
   a nonmagnetic write gap layer located between the pole tip portions of the first and second pole piece layers;
   an insulation stack with at least one coil layer embedded therein located between the yoke portions of the first and second pole piece layers; and
   the first and second pole piece layers being connected at their back gap portions;

a read head including:
   a spin valve sensor;
   nonmagnetic insulative first and second read gap layers;
   the spin valve sensor being located between the first and second read gap layers;
   ferromagnetic first and second shield layers; and
   the first and second read gap layers being located between the first and second shield layers;

the spin valve sensor including:
   a ferromagnetic free layer structure;
   first and second antiparallel (AP) pinned layers;
   a nonmagnetic conductive first spacer layer between the free layer structure and the first AP pinned layer and a nonmagnetic conductive second spacer layer between the free layer structure and the second AP pinned layer;
   an antiferromagnetic first pinning layer exchange coupled to the first AP pinned layer for pinning a magnetic moment of the first AP pinned layer in a first direction; and
   an antiferromagnetic second pinning layer exchange coupled to the second AP pinned layer for pinning a magnetic moment of the second AP pinned layer in a second direction; and
   all of the layers between the free layer structure and the first read gap layer being less conductive or more conductive than all of the layers between the free layer structure and the second read gap layer so that when a sense current is conducted through the sensor in a predetermined direction a net sense current field is exerted on the free layer structure to oppose a net demagnetizing field and a net ferromagnetic coupling field exerted on the free layer structure by the first and second AP pinned layers.

12. A magnetic head assembly as claimed in claim 11 including a nonmagnetic insulative isolation layer between the second shield layer and the first pole piece layer.

13. A magnetic head assembly as claimed in claim 11 wherein the second AP pinned layer is more conductive than the first AP pinned layer.

14. A magnetic head assembly as claimed in claim 11 wherein the first pinning layer is nickel oxide (NiO) and the second pinning layer is composed of metal.

15. A magnetic head assembly having an air bearing surface (ABS), comprising:
a write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions;
a read head including:
a spin valve sensor;
nonmagnetic insulative first and second read gap layers;
the spin valve sensor being located between the first and second read gap layers;
ferromagnetic first and second shield layers; and
the first and second read gap layers being located between the first and second shield layers;
the spin valve sensor including:
a ferromagnetic free layer structure;
first and second antiparallel (AP) pinned layers;
a nonmagnetic conductive first spacer layer between the free layer structure and the first AP pinned layer and a nonmagnetic conductive second spacer layer between the free layer structure and the second AP pinned layer;
an antiferromagnetic first pinning layer exchange coupled to the first AP pinned layer for pinning a magnetic moment of the first AP pinned layer in a first direction; and
an antiferromagnetic second pinning layer exchange coupled to the second AP pinned layer for pinning a magnetic moment of the second AP pinned layer in a second direction;
all of the layers between the free layer structure and the first read gap layer being less conductive or more conductive than all of the layers between the free layer structure and the second read gap layer so that when a sense current is conducted through the sensor in a predetermined direction a net sense current field is exerted on the free layer structure to oppose a net demagnetizing field and a net ferromagnetic coupling field exerted on the free layer structure by the first and second AP pinned layers;
the second AP pinned layer being more conductive than the first AP pinned layer;
the first AP pinned layer having a first antiparallel (AP) coupling film which is located between ferromagnetic first and second AP pinned films;
the second AP pinned layer having a second antiparallel (AP) coupling film which is located between ferromagnetic third and fourth AP pinned films;
the first AP film being exchange coupled to the first pinning layer and the third AP pinned film being exchange coupled to the second pinning layer;
the third AP pinned film having a thickness that is greater than the fourth AP pinned film, the fourth AP pinned layer film having a thickness that is greater than the first AP pinned layer film and the first AP pinned layer film having a thickness that is greater than the second AP pinned layer film; and
the first, second, third and fourth AP pinned films being composed of a same material.

16. A magnetic head assembly as claimed in claim 15 wherein the second spacer layer is more conductive than the first spacer layer.

17. A magnetic head assembly as claimed in claim 16 wherein each of the first and second pinning layers is composed of metal.

18. A magnetic head assembly having an air bearing surface (ABS), comprising:
a write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions;
a read head including:
a spin valve sensor;
nonmagnetic insulative first and second read gap layers;
the spin valve sensor being located between the first and second read gap layers;
ferromagnetic first and second shield layers; and
the first and second read gap layers being located between the first and second shield layers;
the spin valve sensor including:
a ferromagnetic free layer structure;
first and second antiparallel (AP) pinned layers;
a nonmagnetic conductive first spacer layer between the free layer structure and the first AP pinned layer and a nonmagnetic conductive second spacer layer between the free layer structure and the second AP pinned layer;
an antiferromagnetic first pinning layer exchange coupled to the first AP pinned layer for pinning a magnetic moment of the first AP pinned layer in a first direction; and
an antiferromagnetic second pinning layer exchange coupled to the second AP pinned layer for pinning a magnetic moment of the second AP pinned layer in a second direction;
all of the layers between the free layer structure and the first read gap layer being less conductive or more conductive than all of the layers between the free layer structure and the second read gap layer so that when a sense current is conducted through the sensor in a predetermined direction a net sense current field is exerted on the free layer structure to oppose a net demagnetizing field and a net ferromagnetic coupling field exerted on the free layer structure by the first and second AP pinned layers;
the second AP pinned layer being more conductive than the first AP pinned layer;
the first AP pinned layer having a first antiparallel (AP) coupling film which is located between ferromagnetic first and second AP pinned films;
the second AP pinned layer having a second antiparallel (AP) coupling film which is located between ferromagnetic third and fourth AP pinned films;
the first AP film being exchange coupled to the first pinning layer and the third AP pinned film being exchange coupled to the second pinning layer;

the first and third AP pinned films having an equal thickness and the second and fourth AP pinned layer films having an equal thickness;

each of the first and third AP pinned films having a greater thickness than each of the second and fourth AP pinned layer films; and the first, second, third and fourth AP pinned films being composed of a same material.

19. A magnetic disk drive, which has a magnetic head assembly wherein the magnetic head assembly has an air bearing surface and write and read heads, comprising:

the write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions;

the read head including:
a spin valve sensor;
nonmagnetic insulative first and second read gap layers;
the spin valve sensor being located between the first and second read gap layers;
ferromagnetic first and second shield layers; and
the first and second read gap layers being located between the first and second shield layers;

the spin valve sensor including:
a ferromagnetic free layer structure;
first and second antiparallel (AP) pinned layers;
a nonmagnetic conductive first spacer layer between the free layer structure and the first AP pinned layer and a nonmagnetic conductive second spacer layer between the free layer structure and the second AP pinned layer;
an antiferromagnetic first pinning layer exchange coupled to the first AP pinned layer for pinning a magnetic moment of the first AP pinned layer in a first direction; and
an antiferromagnetic second pinning layer exchange coupled to the second AP pinned layer for pinning a magnetic moment of the second AP pinned layer in a second direction; and
all of the layers between the free layer structure and the first read gap layer being less conductive or more conductive than all of the layers between the free layer structure and the second read gap layer so that when a sense current is conducted through the sensor in a predetermined direction a net sense current field is exerted on the free layer structure to oppose a net demagnetizing field and a net ferromagnetic coupling field exerted on the free layer structure by the first and second AP pinned layers;

a housing;

a magnetic disk rotatably supported in the housing;

a support mounted in the housing for supporting the magnetic head assembly with said air bearing surface facing the magnetic disk so that the magnetic head assembly is in a transducing relationship with the magnetic disk;

a spindle motor for rotating the magnetic disk;

an actuator positioning means connected to the support for moving the magnetic head assembly to multiple positions with respect to said magnetic disk; and a processor connected to the magnetic head assembly, to the spindle motor and to the actuator for exchanging signals with the magnetic head, for controlling movement of the magnetic disk and for controlling the position of the magnetic head assembly.

20. A magnetic disk drive as claimed in claim 19 including a nonmagnetic insulative isolation layer between the second shield layer and the first pole piece layer.

21. A magnetic disk drive as claimed in claim 19 wherein the second AP pinned layer is more conductive than the first AP pinned layer.

22. A magnetic disk drive as claimed in claim 19 wherein the first pinning layer is nickel oxide (NiO) and the second pinning layer is composed of metal.

23. A magnetic disk drive, which has a magnetic head assembly wherein the magnetic head assembly has an air bearing surface and write and read heads, comprising:

the write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions;

the read head including:
a spin valve sensor;
nonmagnetic insulative first and second read gap layers;
the spin valve sensor being located between the first and second read gap layers;
ferromagnetic first and second shield layers; and
the first and second read gap layers being located between the first and second shield layers;

the spin valve sensor including:
a ferromagnetic free layer structure;
first and second antiparallel (AP) pinned layers;
a nonmagnetic conductive first spacer layer between the free layer structure and the first AP pinned layer and a nonmagnetic conductive second spacer layer between the free layer structure and the second AP pinned layer;
an antiferromagnetic first pinning layer exchange coupled to the first AP pinned layer for pinning a magnetic moment of the first AP pinned layer in a first direction; and
an antiferromagnetic second pinning layer exchange coupled to the second AP pinned layer for pinning a magnetic moment of the second AP pinned layer in a second direction;
all of the layers between the free layer structure and the first read gap layer being less conductive or more conductive than all of the layers between the free layer structure and the second read gap layer so that when a sense current is conducted through the sensor in a predetermined direction a net sense current field is exerted on the free layer structure to oppose a net demagnetizing field and a net ferromagnetic coupling field exerted on the free layer structure by the first and second AP pinned layers;
the second AP pinned layer being more conductive than the first AP pinned layer;
the first AP pinned layer having a first antiparallel (AP) coupling film which is located between ferromagnetic first and second AP pinned films;

the second AP pinned layer having a second antiparallel (AP) coupling film which is located between ferromagnetic third and fourth AP pinned films;
the first AP film being exchange coupled to the first pinning layer and the third AP pinned film being exchange coupled to the second pinning layer;
the third AP pinned film having a thickness that is greater than the fourth AP pinned film, the fourth AP pinned layer film having a thickness that is greater than the first AP pinned layer film and the first AP pinned layer film having a thickness that is greater than the second AP pinned layer film; and
the first, second, third and fourth AP pinned films being composed of a same material;
a housing;
a magnetic disk rotatably supported in the housing;
a support mounted in the housing for supporting the magnetic head assembly with said air bearing surface facing the magnetic disk so that the magnetic head assembly is in a transducing relationship with the magnetic disk;
a spindle motor for rotating the magnetic disk;
an actuator positioning means connected to the support for moving the magnetic head assembly to multiple positions with respect to said magnetic disk; and
a processor connected to the magnetic head assembly, to the spindle motor and to the actuator for exchanging signals with the magnetic head assembly, for controlling movement of the magnetic disk and for controlling the position of the magnetic head assembly.

24. A magnetic disk drive as claimed in claim 23 wherein the second spacer layer is more conductive than the first spacer layer.

25. A magnetic disk drive as claimed in claim 24 wherein each of the first and second pinning layers is composed of metal.

26. A magnetic disk drive, which has a magnetic head assembly wherein the magnetic head assembly has an air bearing surface and write and read heads, comprising:
the write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions;
the read head including:
a spin valve sensor;
nonmagnetic insulative first and second read gap layers;
the spin valve sensor being located between the first and second read gap layers;
ferromagnetic first and second shield layers; and
the first and second read gap layers being located between the first and second shield layers;
the spin valve sensor including:
a ferromagnetic free layer structure;
first and second antiparallel (AP) pinned layers;
a nonmagnetic conductive first spacer layer between the free layer structure and the first AP pinned layer and a nonmagnetic conductive second spacer layer between the free layer structure and the second AP pinned layer;
an antiferromagnetic first pinning layer exchange coupled to the first AP pinned layer for pinning a magnetic moment of the first AP pinned layer in a first direction; and
an antiferromagnetic second pinning layer exchange coupled to the second AP pinned layer for pinning a magnetic moment of the second AP pinned layer in a second direction;
all of the layers between the free layer structure and the first read gap layer being less conductive or more conductive than all of the layers between the free layer structure and the second read gap layer so that when a sense current is conducted through the sensor in a predetermined direction a net sense current field is exerted on the free layer structure to oppose a net demagnetizing field and a net ferromagnetic coupling field exerted on the free layer structure by the first and second AP pinned layers;
the second AP pinned layer being more conductive than the first AP pinned layer;
the first AP pinned layer having a first antiparallel (AP) coupling film which is located between ferromagnetic first and second AP pinned films;
the second AP pinned layer having a second antiparallel (AP) coupling film which is located between ferromagnetic third and fourth AP pinned films;
the first AP film being exchange coupled to the first pinning layer and the third AP pinned film being exchange coupled to the second pinning layer;
the first and third AP pinned films having an equal thickness and the second and fourth AP pinned layer films having an equal thickness;
each of the first and third AP pinned films having a greater thickness than each of the second and fourth AP pinned layer films; and
the first, second, third and fourth AP pinned films being composed of a same material;
a housing;
a magnetic disk rotatably supported in the housing;
a support mounted in the housing for supporting the magnetic head assembly with said air bearing surface facing the magnetic disk so that the magnetic head assembly is in a transducing relationship with the magnetic disk;
a spindle motor for rotating the magnetic disk;
an actuator positioning means connected to the support for moving the magnetic head assembly to multiple positions with respect to said magnetic disk; and
a processor connected to the magnetic head assembly, to the spindle motor and to the actuator for exchanging signals with the magnetic head, for controlling movement of the magnetic disk and for controlling the position of the magnetic head assembly.

27. A method of making a magnetic read head comprising:
forming nonmagnetic insulative first and second read gap layers with a spin valve sensor formed between the first and second read gap layers; and
forming ferromagnetic first and second shield layers with the first and second read gap layers formed between the first and second shield layers;
a making of the spin valve sensor comprising the steps of:
forming a ferromagnetic free layer structure;
forming first and second antiparallel (AP) pinned layers;
forming a nonmagnetic conductive first spacer layer between the free layer structure and the first AP pinned layer and a nonmagnetic conductive second spacer layer between the free layer structure and the second AP pinned layer;

forming an antiferromagnetic first pinning layer exchange coupled to the first AP pinned layer for pinning a magnetic moment of the first AP pinned layer in a first direction; and forming an antiferromagnetic second pinning layer exchange coupled to the second AP pinned layer for pinning a magnetic moment of the second AP pinned layer in a second direction; and all of the layers between the free layer structure and the first read gap layer being formed less conductive or more conductive than all of the layers between the free layer structure and the second read gap layer so that when a sense current is conducted through the sensor in a predetermined direction a net sense current field is exerted on the free layer structure to oppose a net demagnetizing field and a net ferromagnetic coupling field exerted on the free layer structure by the first and second AP pinned layers.

28. A method of making a magnetic read head as claimed in claim 27 wherein the second AP pinned layer is formed more conductive than the first AP pinned layer.

29. A method of making a magnetic read head as claimed in claim 27 wherein the first pinning layer is formed of nickel oxide (NiO) and the second pinning layer is formed of metal.

30. A method of making a magnetic read head comprising:
forming nonmagnetic insulative first and second read gap layers with a spin valve sensor formed between the first and second read gap layers; and forming ferromagnetic first and second shield layers with the first and second read gap layers being formed between the first and second shield layers;

a making of the spin valve sensor comprising the steps of:
forming a ferromagnetic free layer structure;
forming first and second antiparallel (AP) pinned layers;
forming a nonmagnetic conductive first spacer layer between the free layer structure and the first AP pinned layer and a nonmagnetic conductive second spacer layer between the free layer structure and the second AP pinned layer;

forming an antiferromagnetic first pinning layer exchange coupled to the first AP pinned layer for pinning a magnetic moment of the first AP pinned layer in a first direction; and forming an antiferromagnetic second pinning layer exchange coupled to the second AP pinned layer for pinning a magnetic moment of the second AP pinned layer in a second direction;

all of the layers between the free layer structure and the first read gap layer being formed less conductive or more conductive than all of the layers between the free layer structure and the second read gap layer so that when a sense current is conducted through the sensor in a predetermined direction a net sense current field is exerted on the free layer structure to oppose a net demagnetizing field and a net ferromagnetic coupling field exerted on the free layer structure by the first and second AP pinned layers;

the second AP pinned layer being formed more conductive than the first AP pinned layer;

the first AP pinned layer being formed with a first antiparallel (AP) coupling film which is located between ferromagnetic first and second AP pinned films;

the second AP pinned layer being formed with a second antiparallel (AP) coupling film which is located between ferromagnetic third and fourth AP pinned films;

the first AP film being exchange coupled to the first pinning layer and the third AP pinned film being exchange coupled to the second pinning layer;

the third AP pinned film being formed with a thickness that is greater than the fourth AP pinned film, the fourth AP pinned layer film being formed with a thickness that is greater than the first AP pinned layer film and the first AP pinned layer film being formed with a thickness that is greater than the second AP pinned layer film; and the first, second, third and fourth AP pinned films being formed of a same material.

31. A method of making a magnetic read head as claimed in claim 30 wherein the second spacer layer is formed more conductive than the first spacer layer.

32. A method of making a magnetic read head as claimed in claim 31 wherein each of the first and second pinning layers are formed of metal.

33. A method of making a magnetic read head as claimed in claim 32 wherein the free layer structure is formed with a first free layer of nickel iron (NiFe) between second and third free layers of cobalt iron (CoFe).

34. A method of making a magnetic read head comprising:
forming nonmagnetic insulative first and second read gap layers with a spin valve sensor formed between the first and second read gap layers; and forming ferromagnetic first and second shield layers with the first and second read gap layers being formed between the first and second shield layers;

a making of the spin valve sensor comprising the steps of:
forming a ferromagnetic free layer structure;
forming first and second antiparallel (AP) pinned layers;
forming a nonmagnetic conductive first spacer layer between the free layer structure and the first AP pinned layer and a nonmagnetic conductive second spacer layer between the free layer structure and the second AP pinned layer;

forming an antiferromagnetic first pinning layer exchange coupled to the first AP pinned layer for pinning a magnetic moment of the first AP pinned layer in a first direction; and forming an antiferromagnetic second pinning layer exchange coupled to the second AP pinned layer for pinning a magnetic moment of the second AP pinned layer in a second direction;

all of the layers between the free layer structure and the first read gap layer being formed less conductive or more conductive than all of the layers between the free layer structure and the second read gap layer so that when a sense current is conducted through the sensor in a predetermined direction a net sense current field is exerted on the free layer structure to oppose a net demagnetizing field and a net ferromagnetic coupling field exerted on the free layer structure by the first and second AP pinned layers;

the second AP pinned layer being formed more conductive than the first AP pinned layer;

the first AP pinned layer being formed with a first antiparallel (AP) coupling film which is located between ferromagnetic first and second AP pinned films;

the second AP pinned layer being formed with a second antiparallel (AP) coupling film which is located between ferromagnetic third and fourth AP pinned films;

the first AP film being exchange coupled to the first pinning layer and the third AP pinned film being exchange coupled to the second pinning layer;

the first and third AP pinned films being formed with equal thicknesses and the second and fourth AP pinned layer films being formed with equal thicknesses;

each of the first and third AP pinned films being formed with a greater thickness than each of the second and fourth AP pinned layer films; and the first, second, third and fourth AP pinned films being formed of a same material.

35. A method of making a magnetic read head as claimed in claim 34 wherein the first pinning layer is formed of nickel oxide (NiO) and the second pinning layer is formed of metal.

36. A method of making a magnetic read head as claimed in claim 35 wherein the free layer structure is formed with a first free layer of nickel iron (NiFe) between second and third free layers of cobalt iron (CoFe).

37. A method of making a magnetic head assembly, which has an air bearing surface (ABS), comprising the steps of:
making a write head comprising the steps of:
forming ferromagnetic first and second pole piece layers in pole tip, yoke and back regions wherein the yoke region is located between the pole tip and back gap regions;
forming a nonmagnetic nonconductive write gap layer between the first and second pole piece layers in the pole tip region;
forming an insulation stack with at least one coil layer embedded therein between the first and second pole piece layers in the yoke region; and
connecting the first and second pole piece layers at said back gap region;
making a read head comprising the steps of:
forming nonmagnetic insulative first and second read gap layers with a spin valve sensor formed between the first and second read gap layers; and
forming ferromagnetic first and second shield layers with the first and second read gap layers formed between the first and second shield layers;
forming the spin valve sensor and nonmagnetic insulative first and second read gap layers with the spin valve sensor located between the first and second read gap layers; and
forming ferromagnetic first and second shield layers with the first and second read gap layers located between the first and second shield layers;
making the spin valve sensor comprising the steps of:
forming a ferromagnetic free layer structure;
forming first and second antiparallel (AP) pinned layers;
forming a nonmagnetic conductive first spacer layer between the free layer structure and the first AP pinned layer and a nonmagnetic conductive second spacer layer between the free layer structure and the second AP pinned layer;
forming an antiferromagnetic first pinning layer exchange coupled to the first AP pinned layer for pinning a magnetic moment of the first AP pinned layer in a first direction;
forming an antiferromagnetic second pinning layer exchange coupled to the second AP pinned layer for pinning a magnetic moment of the second AP pinned layer in a second direction; and
all of the layers between the free layer structure and the first read gap layer being formed less conductive or more conductive than all of the layers between the free layer structure and the second read gap layer so that when a sense current is conducted through the sensor in a predetermined direction a net sense current field is exerted on the free layer structure to oppose a net demagnetizing field and a net ferromagnetic coupling field exerted on the free layer structure by the first and second AP pinned layers.

38. A method of making a magnetic head assembly as claimed in claim 37 including forming a nonmagnetic insulative isolation layer between the second shield layer and the first pole piece layer.

39. A method of making a magnetic head assembly as claimed in claim 37 wherein the second AP pinned layer is formed more conductive than the first AP pinned layer.

40. A method of making a magnetic head assembly as claimed in claim 37 wherein the first pinning layer is formed of nickel oxide (NiO) and the second pinning layer is formed of metal.

41. A method of making a magnetic head assembly, which has an air bearing surface (ABS), comprising the steps of:
making a write head comprising the steps of:
forming ferromagnetic first and second pole piece layers in pole tip, yoke and back regions wherein the yoke region is located between the pole tip and back gap regions;
forming a nonmagnetic nonconductive write gap layer between the first and second pole piece layers in the pole tip region;
forming an insulation stack with at least one coil layer embedded therein between the first and second pole piece layers in the yoke region; and
connecting the first and second pole piece layers at said back gap region;
making a read head comprising the steps of:
forming nonmagnetic insulative first and second read gap layers with a spin valve sensor formed between the first and second read gap layers; and
forming ferromagnetic first and second shield layers with the first and second read gap layers formed between the first and second shield layers;
forming the spin valve sensor and nonmagnetic insulative first and second read gap layers with the spin valve sensor located between the first and second read gap layers; and
forming ferromagnetic first and second shield layers with the first and second read gap layers located between the first and second shield layers;
making the spin valve sensor comprising the steps of:
forming a ferromagnetic free layer structure;
forming first and second antiparallel (AP) pinned layers;
forming a nonmagnetic conductive first spacer layer between the free layer structure and the first AP pinned layer and a nonmagnetic conductive second spacer layer between the free layer structure and the second AP pinned layer;
forming an antiferromagnetic first pinning layer exchange coupled to the first AP pinned layer for pinning a magnetic moment of the first AP pinned layer in a first direction;
forming an antiferromagnetic second pinning layer exchange coupled to the second AP pinned layer for pinning a magnetic moment of the second AP pinned layer in a second direction;
all of the layers between the free layer structure and the first read gap layer being formed less conductive or more conductive than all of the layers between the free layer structure and the second read gap layer so that when a sense current is conducted through the sensor in a predetermined direction a net sense current field is exerted on the free layer structure to oppose a net demagnetizing field and a net ferromagnetic coupling field exerted on the free layer structure by the first and second AP pinned layers;

the second AP pinned layer being formed more conductive than the first AP pinned layer;

the first AP pinned layer being formed with a first antiparallel (AP) coupling film which is located between ferromagnetic first and second AP pinned films;

the second AP pinned layer being formed with a second antiparallel (AP) coupling film which is located between ferromagnetic third and fourth AP pinned films;

the first AP film being exchange coupled to the first pinning layer and the third AP pinned film being exchange coupled to the second pinning layer;

the third AP pinned film being formed with a thickness that is greater than the fourth AP pinned film, the fourth AP pinned layer film being formed with a thickness that is greater than the first AP pinned layer film and the first AP pinned layer film being formed with a thickness that is greater than the second AP pinned layer film; and the first, second, third and fourth AP pinned films being formed of a same material.

42. A method of making a magnetic head assembly as claimed in claim 41 wherein the second spacer layer is formed more conductive than the first spacer layer.

43. A method of making a magnetic head assembly as claimed in claim 42 wherein each of the first and second pinning layers are formed of metal.

44. A method of making a magnetic head assembly, which has an air bearing surface (ABS), comprising the steps of:

making a write head comprising the steps of:
  forming ferromagnetic first and second pole piece layers in pole tip, yoke and back regions wherein the yoke region is located between the pole tip and back gap regions;
  forming a nonmagnetic nonconductive write gap layer between the first and second pole piece layers in the pole tip region;
  forming an insulation stack with at least one coil layer embedded therein between the first and second pole piece layers in the yoke region; and
  connecting the first and second pole piece layers at said back gap region;

making a read head comprising the steps of:
  forming nonmagnetic insulative first and second read gap layers with a spin valve sensor formed between the first and second read gap layers; and
  forming ferromagnetic first and second shield layers with the first and second read gap layers formed between the first and second shield layers;

forming the spin valve sensor and nonmagnetic insulative first and second read gap layers with the spin valve sensor located between the first and second read gap layers; and forming ferromagnetic first and second shield layers with the first and second read gap layers located between the first and second shield layers;

making the spin valve sensor comprising the steps of:
  forming a ferromagnetic free layer structure;
  forming first and second antiparallel (AP) pinned layers;
  forming a nonmagnetic conductive first spacer layer between the free layer structure and the first AP pinned layer and a nonmagnetic conductive second spacer layer between the free layer structure and the second AP pinned layer;
  forming an antiferromagnetic first pinning layer exchange coupled to the first AP pinned layer for pinning a magnetic moment of the first AP pinned layer in a first direction;
  forming an antiferromagnetic second pinning layer exchange coupled to the second AP pinned layer for pinning a magnetic moment of the second AP pinned layer in a second direction;
  all of the layers between the free layer structure and the first read gap layer being formed less conductive or more conductive than all of the layers between the free layer structure and the second read gap layer so that when a sense current is conducted through the sensor in a predetermined direction a net sense current field is exerted on the free layer structure to oppose a net demagnetizing field and a net ferromagnetic coupling field exerted on the free layer structure by the first and second AP pinned layers;
  the second AP pinned layer being formed more conductive than the first AP pinned layer;
  the first AP pinned layer being formed with a first antiparallel (AP) coupling film which is located between ferromagnetic first and second AP pinned films;
  the second AP pinned layer being formed with a second antiparallel (AP) coupling film which is located between ferromagnetic third and fourth AP pinned films;
  the first AP film being exchange coupled to the first pinning layer and the third AP pinned film being exchange coupled to the second pinning layer;
  the first and third AP pinned films being formed with equal thicknesses and the second and fourth AP pinned layer films being formed with equal thicknesses;
  each of the first and third AP pinned films being formed with a greater thickness than each of the second and fourth AP pinned layer films; and
  the first, second, third and fourth AP pinned films being formed of a same material.

45. A method of making a magnetic head assembly, which has an air bearing surface (ABS), comprising the steps of:

making a write head comprising the steps of:
  forming ferromagnetic first and second pole piece layers in pole tip, yoke and back regions wherein the yoke region is located between the pole tip and back gap regions;
  forming a nonmagnetic nonconductive write gap layer between the first and second pole piece layers in the pole tip region;
  forming an insulation stack with at least one coil layer embedded therein between the first and second pole piece layers in the yoke region; and
  connecting the first and second pole piece layers at said back gap region;

making a read head comprising the steps of:
  forming nonmagnetic insulative first and second read gap layers with a spin valve sensor formed between the first and second read gap layers; and
  forming ferromagnetic first and second shield layers with the first and second read gap layers formed between the first and second shield layers;

forming the spin valve sensor and nonmagnetic insulative first and second read gap layers with the spin valve sensor located between the first and second read gap layers; and forming ferromagnetic first and second shield layers with the first and second read gap layers located between the first and second shield layers;

making the spin valve sensor comprising the steps of:

forming a ferromagnetic free layer structure;

forming first and second antiparallel (AP) pinned layers;

forming a nonmagnetic conductive first spacer layer between the free layer structure and the first AP pinned layer and a nonmagnetic conductive second spacer layer between the free layer structure and the second AP pinned layer;

forming an antiferromagnetic first pinning layer exchange coupled to the first AP pinned layer for pinning a magnetic moment of the first AP pinned layer in a first direction;

forming an antiferromagnetic second pinning layer exchange coupled to the second AP pinned layer for pinning a magnetic moment of the second AP pinned layer in a second direction;

all of the layers between the free layer structure and the first read gap layer being formed less conductive or more conductive than all of the layers between the free layer structure and the second read gap layer so that when a sense current is conducted through the sensor in a predetermined direction a net sense current field is exerted on the free layer structure to oppose a net demagnetizing field and a net ferromagnetic coupling field exerted on the free layer structure by the first and second AP pinned layers;

the second AP pinned layer being formed more conductive than the first AP pinned layer;

the first AP pinned layer being formed with a first antiparallel (AP) coupling film which is located between ferromagnetic first and second AP pinned films;

the second AP pinned layer being formed with a second antiparallel (AP) coupling film which is located between ferromagnetic third and fourth AP pinned films;

the first AP film being exchange coupled to the first pinning layer and the third AP pinned film being exchange coupled to the second pinning layer;

the third AP pinned film being formed with a thickness that is greater than the fourth AP pinned film, the fourth AP pinned layer film being formed with a thickness that is greater than the first AP pinned layer film and the first AP pinned layer film being formed with a thickness that is greater than the second AP pinned layer film; and the first, second, third and fourth AP pinned films being formed of a same material.

\* \* \* \* \*